United States Patent [19]

Kobayashi et al.

[11] Patent Number: 4,579,096

[45] Date of Patent: Apr. 1, 1986

[54] DIESEL FUEL INJECTION PUMP WITH ELECTROMAGNETIC FUEL SPILLING VALVE HAVING PILOT VALVE PROVIDING HIGH RESPONSIVENESS

[75] Inventors: Fumiaki Kobayashi; Yoshiyasu Ito; Hideo Miyagi, all of Toyota, Japan

[73] Assignee: Toyota Jidosha Kabushiki Kaisha, Toyota, Japan

[21] Appl. No.: 650,166

[22] Filed: Sep. 13, 1984

[30] Foreign Application Priority Data

Dec. 8, 1983 [JP] Japan .................... 58-232092
Feb. 6, 1984 [JP] Japan .................... 59-19704

[51] Int. Cl.$^4$ ............................. F02B 3/00
[52] U.S. Cl. ........................ 123/299; 123/458; 123/459
[58] Field of Search ......... 123/458, 459, 449, 506, 123/300, 299

[56] References Cited

U.S. PATENT DOCUMENTS

| | | | |
|---|---|---|---|
| 1,664,608 | 4/1928 | French ............................ | 123/458 |
| 3,456,629 | 7/1969 | Dangauthier ..................... | 123/299 |
| 4,385,614 | 5/1983 | Eheim et al. ..................... | 123/506 |
| 4,395,987 | 8/1983 | Kobayashi et al. ............... | 123/458 |
| 4,412,519 | 11/1983 | Hoch et al. ..................... | 123/458 |
| 4,480,619 | 11/1984 | Igashira et al. .................. | 123/460 |

FOREIGN PATENT DOCUMENTS

| | | | |
|---|---|---|---|
| 65858 | 4/1982 | Japan ............................. | 123/449 |
| 128461 | 8/1983 | Japan ............................. | 123/506 |
| 2061403 | 5/1981 | United Kingdom ............... | 123/458 |

Primary Examiner—Magdalen Y. C. Moy
Attorney, Agent, or Firm—Kenyon & Kenyon

[57] ABSTRACT

A fuel injection pump for a diesel engine includes a housing and a plunger which slides in a bore in the housing, with a high pressure chamber defined at an end of the plunger. The plunger rotates with the crankshaft and reciprocates so as to pump fuel from the high pressure chamber to the engine cylinders, under the control of an electromagnetic valve. This valve includes a pilot valve which selectively vents the high pressure chamber, which is operated to open and close by selective supply of electrical energy thereto, and a balance member which is driven by a fluid force arising when the pilot valve is thus opened and a relatively small flow of fuel is released from the high pressure chamber, and which when so driven releases a relatively large flow of fuel from the high pressure chamber. Thereby the response of the electromagnetic valve as a whole is made quick, so that it is possible to inject a pilot fuel injection spirt before the main spirt of fuel injection, thus slowing down the combustion speed when the engine is functioning under low load conditions, and thereby providing smooth and gradual combustion, thus preventing diesel knocking. Optionally, the pump may include a means for, after said electromagnetic valve has been actuated by supply of electric current in a particular direction, supplying electric current in the direction opposite to said particular direction thereto, so as to avoid problems caused by magnetization effects of the solenoid core.

3 Claims, 11 Drawing Figures (A) INITIATION CURRENT (B) RETAINING CURRENT (C) REVERSE CONTROL CURRENT (D) ELECTROMAGNETIC VALVE SOLENOID CURRENT

DIESEL FUEL INJECTION PUMP WITH ELECTROMAGNETIC FUEL SPILLING VALVE HAVING PILOT VALVE PROVIDING HIGH RESPONSIVENESS

BACKGROUND OF THE INVENTION

The present invention relates to a fuel injection pump for a diesel engine, and more particularly relates to a type of diesel fuel injection pump in which the injection of fuel is performed in two phases: an earlier pilot fuel injection spirt and a later main fuel injection spirt.

In a diesel engine, the diesel fuel is injected at high pressure by a diesel fuel injection pump through fuel injectors into the cylinders of the engine in turn upon their compression strokes, and ignites due to the natural compression in the cylinders and is combusted therein without any special electrical or mechanical ignition means being required. Diesel knocking, especially under low load, can present a problem, and therefore there has been proposed a per se known type of fuel injection control, in which into each cylinder of the engine, on its compression stroke, there are injected two successive fuel injection spirts: a pilot fuel injection spirt, of a relatively low volume of diesel fuel, which is injected at an earlier time in order to initiate the combustion process within the cylinder, and a main fuel injection spirt, of a relatively large volume of diesel fuel, which is injected at a slightly later time in the compression stroke in order to actually provide a proper amount of fuel for engine operation. The combustion of this later main fuel injection spirt is much aided by the fact that the low volume pilot fuel injection spirt is already being combusted within the combustion chamber, and by this concept diesel knocking, especially at low engine load condition such as the idling condition, can be effectively eliminated, because of the retardation of the overall combustion process which causes smooth and gradual combustion in the combustion chamber to be achieved.

There is known a type of fuel injection pump for a diesel internal combustion engine which includes a plunger which reciprocates to and fro in a bore defined in a housing, a high pressure chamber being defined between one end of the plunger and the end of the bore. During the suction stroke of the plunger as this high pressure chamber expands in size, diesel fuel is sucked into this high pressure chamber from a quantity of diesel fuel contained in a relatively low pressure chamber through a fuel supply passage; and during the compression stroke of the plunger as the high pressure chamber subsequently contracts in size, this diesel fuel in the high pressure chamber is squeezed and is brought to a high pressure and is ejected through an injection passage therefor to a fuel injector in a cylinder of the diesel internal combustion engine. Sometimes, in the case that the diesel fuel injection pump is a so called distribution type pump, the plunger is rotated as it reciprocates by an input shaft which is rotationally coupled to it although not axially coupled to it, and by a per se well known construction the spirt of highly compressed diesel fuel is directed to the appropriate one of the plurality of cylinders of the internal combustion engine. Now, such a fuel injection pump injects an amount of diesel fuel in each pump stroke which is regulated by a fuel injection amount control means which selectively vents the high pressure chamber. This control means ceases to vent the high pressure chamber when it is appropriate to start the fuel injection spirt, during the compression stroke of the plunger, and at this instant the almost incompressible diesel fuel in the high pressure chamber starts to be squeezed and injected, as explained above. When it is appropriate to terminate the fuel injection spirt, then the control means starts again to vent the high pressure chamber, and at this instant the diesel fuel in the high pressure chamber ceases to be squeezed and therefore the injection is immediately stopped.

In the case of a mechanical diesel fuel injection pump, it has been conventional for this high pressure chamber selective venting means to be a spill ring, which is mechanically positioned according to the position of the accelerator pedal which is controlling the load on the engine, and whose position controls the timing instant of the end of the non-vented time period of the high pressure chamber. In such a mechanical type of fuel injection diesel pump, it is very difficult to perform such a two phase type of fuel injection as described above in which a pilot fuel injection spirt of low volume precedes the main fuel injection spirt, because of the fact that typically the accelerator pedal simply positions the spill ring through a simple linkage, and in such a construction there is no good way of implementing the two phase fuel injection method described above in a sufficiently flexible manner.

However, nowadays electronically controlled fuel injection pumps are coming into use, in which the selective venting of the high pressure chamber is performed, not mechanically by the use of a spill ring, but electronically by an electromagnetic valve which is controlled by an electronic control system such as one incorporating a microcomputer. In such an electronic fuel injection pump, the electronic control system, for each spirt of fuel injection, calculates how much fuel is to be injected in this spirt, and then at an appropriate time point for the start of fuel injection closes said electromagnetic valve, so as to terminate fuel spilling from the high pressure chamber and so as thereby to start fuel injection. After the electronic control system has calculated that the proper amount of fuel has been injected by the movement of the plunger in the direction to reduce the size of the high pressure chamber, then said control system opens said electromagnetic valve for fuel spilling again, thus immediately terminating fuel injection. In such an electronic type of fuel injection pump, in theory the two phase fuel injection method described above could be well implemented.

However, the type of electromagnetic valve for fuel spilling that has heretofore been proposed for such an electronic type of fuel injection pump has been of the prior art direct action type shown in FIG. 1 of the accompanying drawings as an example. In this injection pump of this figure, of which only a right side part including the electromagnetic valve 3 for fuel spilling is shown in longitudinal cross section, the plunger described above is designated by the reference numeral 5, and reciprocates as it rotates, and the high pressure chamber 7 for pumping the fuel is defined at the right hand end of this plunger 5, while diesel fuel which is squeezed in this high pressure chamber 7 by rightward movement of the plunger 5, when the high pressure chamber 7 is not being vented by the valve 3, is squirted towards a fuel injector of the diesel engine via a delivery valve 9. The electromagnetic valve 3 comprises a solenoid coil 15 and a valve element 11 which slides to and fro in a bore, being biased leftward in the figure by a compression coil spring 13 and being attracted rightward in the figure by the magnetic action of the solenoid coil 15, when actuating electrical energy is supplied to the valve 3. The tip 21 of the valve element 13 is opposed to a hole in a valve seat 23 which opens between the high pressure chamber 7 and a drain passage 25, and thus, when the solenoid coil 15 is not supplied with actuating electrical energy, the valve element 11 is biased leftwards in the figure by the compression coil spring 13 so that its tip presses against the hole in the valve seat 23 and closes it, preventing the high pressure chamber 7 from being drained and thus causing fuel injection through the delivery valve 9 to be performed, when the plunger 5 moves rightwards on its compression stroke. But, on the other hand, when the solenoid coil 15 is supplied with actuating electrical energy, the valve element 11 is attracted rightwards in the figure against the biasing action of the compression coil spring 13 which is overcome so that its tip is moved away from the hole in the valve seat 23 and opens this hole, thus opening the high pressure chamber 7 to the drain 25 and thus causing fuel injection through the delivery valve 9 to be prevented by draining and relieving the pressure inside said chamber 7, even when the plunger 5 moves rightwards on its compression stroke.

In such a type of direct action electromagnetic valve for fuel spilling, when it is attempted to be applied to fuel injection of the above described sort performed in two phases, an earlier pilot fuel injection spirt and a later main fuel injection spirt, the problem arises that its responsiveness is too slow. For operation in such a mode, very high speed response is needed in order for the fuel injection pump to be able to inject the pilot fuel injection spirt, since this spirt is of relatively small volume and has a relatively short duration, and the response time required of the electromagnetic valve is typically of the order of one to two milliseconds or so. Such a direct action electromagnetic valve for fuel spilling as described above is not capable of providing such a good response time, and accordingly as yet no diesel fuel injection pump which injects a pilot injection fuel spirt prior to the main fuel injection fuel spirt has been put into practical use.

Further, in this type of direct action electromagnetic valve for fuel spilling, since the pressure receiving area of the valve element 11, i.e. the opening area of the hole through the valve seat 23, is quite large, a large force is applied to it by the very high pressure generated in the high pressure chamber 7 on the compression stroke of the plunger 5. Therefore, in order to keep the hole through the valve seat 23 closed when fuel injection is being required, a large force is required for pressing the valve element 11 against it. In the case of an electromagnetic valve for fuel spilling of a normally closed type, this means that the spring 13 which biases the valve element 11 is required to be large in size and heavy, and correspondingly the solenoid coil 15 is required to be large and powerful in order to counteract the biasing force of this spring 13, and therefore the power consumption of this solenoid coil becomes large, and the drive circuitry therefore becomes massive and complicated. Even in the case of an electromagnetic valve for fuel spilling of a normally open type, although the biasing spring is not required to be extremely massive, still this problem of the solenoid coil and its circuitry being required to be powerful and bulky remains.

Another type of problem that can occur with an electromagnetic valve for fuel spilling, especially in the case that such a valve is of the normally open type which is closed by supply of electric current to its solenoid coil, is that upon cessation of the supply of electric current to said solenoid coil the valve does not respond immediately. This can be due to the effect of residual magnetism, and can cause irregularities and inaccuracies in the supply of injected diesel fuel, when such an electromagnetic valve is applied for fuel spilling. In the case of a normally open type electromagnetic valve, this can cause the risk that fuel injection should linger on for some time after it should have stopped, and this can cause the response of the valve to be degraded. On the other hand, in the case of a normally closed type electromagnetic valve, this can cause the risk that fuel injection is not properly started some time after it should have started, and again this can cause the response and the performance of the valve to be degraded. Particularly in the case outlined above, wherein the fuel injection is intended to be performed in two phases, a pilot fuel injection spirt and then subsequently a main fuel injection spirt, this poor response time of the valve can be very troublesome.

It might be conceived of for the control system for the electromagnetic valve to make an allowance for this type of residual magnetism effect, but the problem arises that, because of the unpredictable nature of residual magnetism effects, such an effect is impossible to predict accurately, and accordingly this solution is not really workable.

SUMMARY OF THE INVENTION

Accordingly, it is a primary object of the present invention to provide a diesel fuel injection pump, which performs the injection of fuel in two phases: an earlier pilot fuel injection spirt and a later main fuel injection spirt.

It is a further object of the present invention to provide such a diesel fuel injection pump, in which the control of fuel injection is provided by an electromagnetic valve for fuel spilling.

It is a further object of the present invention to provide such a diesel fuel injection pump, which performs pilot fuel injection prior to main fuel injection, and in which the response characteristics of the electromagnetic valve for fuel spilling are adequate.

It is a further object of the present invention to provide such a diesel fuel injection pump, in which the electromagnetic valve for fuel spilling has a high response speed.

It is a further object of the present invention to provide such a diesel fuel injection pump, in which the electromagnetic valve for fuel spilling is compact.

It is a further object of the present invention to provide such a diesel fuel injection pump, in which the electromagnetic valve for fuel spilling has a small solenoid coil portion.

It is a further object of the present invention to provide such a diesel fuel injection pump, in which the power requirements of the electromagnetic valve for fuel spilling are low.

It is a further object of the present invention to provide such a diesel fuel injection pump, in which the drive circuitry for the electromagnetic valve for fuel spilling is not required to be complicated.

It is a further object of the present invention to provide such a diesel fuel injection pump, in which residual magnetization effects do not degrade the response time and the performance of the pump.

It is a further object of the present invention to provide such a diesel fuel injection pump, in which quick demagnetization of the magnetic members of the electromagnetic valve for fuel spilling after energization of the solenoid coil thereof ensures a good response time and performance of the pump.

It is a yet further object of the present invention to provide such a diesel fuel injection pump, in the operation of which diesel knocking is prevented.

It is a yet further object of the present invention to provide such a diesel fuel injection pump, in the operation of which smooth and gradual combustion of fuel in the combustion chambers of the diesel engine is promoted.

It is a yet further object of the present invention to provide such a diesel fuel injection pump, in the operation of which the speed of combustion of fuel in the combustion chambers is delayed, particularly when the engine load is small.

According to the most general aspect of the present invention, these and other objects are accomplished by, for a diesel engine comprising cylinders and a crankshaft: a fuel injection pump, comprising: (a) an input shaft which is rotated in a predetermined phase relationship with said crankshaft; (b) a housing and a plunger which slides in a bore formed in said housing and is coaxial with said input shaft, a high pressure chamber being defined at an end of said plunger between it and said bore, and another end of said plunger being rotationally engaged with said input shaft but being free to move axially with respect thereto, said plunger being reciprocated axially to and fro within said bore according to its rotational position; (c) a means for communicating said high pressure chamber to inject fuel into one or another cylinder of said diesel engine, according to the rotational position of said plunger, substantially only when said plunger is axially moving so as to reduce the size of said high pressure chamber; (d) an electrically actuated electromagnetic valve which selectively vents said high pressure chamber; (e) a means for selectively actuating and deactuating said electromagnetic valve, so as to provide fuel injection in appropriate amount to said diesel engine; (f) said electromagnetic valve comprising: (g) a pilot valve selectively venting said high pressure chamber, which is operated to open and close by selective supply of electrical energy thereto; and (h) a balance member which is driven by a fluid force arising when the pilot valve is thus opened and a relatively small flow of fuel is released from said high pressure chamber, and which when so driven releases a relatively large flow of fuel from said high pressure chamber.

According to such a structure, since the pilot electromagnetic valve, which controls said relatively small flow of fuel from said high pressure chamber and accordingly is not required to be a very large valve, is the one which is required to respond to actuating electrical energy, its response time can be very quick and nimble. The movement of the balance member (which may be a piston or the like) to release the relatively large flow of fuel from said high pressure chamber is effective for venting the pressure within the high pressure chamber quickly, as soon as fuel injection into the cylinder of the engine is to be stopped. Thereby, as a whole, the electromagnetic valve for fuel spilling has a high response speed, and its response characteristics are found to be adequate for its use for the type of fuel injection explained above in which a pilot fuel injection spirt is injected into the combustion chamber of the engine before the main fuel injection spirt. Accordingly, it becomes possible to put such a type of fuel injection pump which provides such a pilot fuel injection pulse into practical use for a diesel engine. Further, this is made possible, while keeping the electromagnetic valve for fuel spilling compact, and allowing it to have a small solenoid coil portion, which keeps its power requirements low, and means that the drive circuitry for such an electromagnetic valve for fuel spilling is not required to be complicated.

Further, according to a more particular aspect of the present invention, these and other objects are more particularly and concretely accomplished by such a diesel fuel injection pump as described above, further comprising a means for, after said electromagnetic valve has been actuated by supply of electric current in a particular direction thereto, supplying electric current in the direction opposite to said particular direction thereto.

According to such a structure, any residual magnetic effects which may have been generated in magnetic members of said electromagnetic valve such as an iron core thereof are quickly neutralized by the reverse supply of electric current to the valve, and accordingly such residual magnetic effects are unable to deteriorate the response time and the performance of the electromagnetic valve. Accordingly, the forcible demagnetization of the valve is effective for promoting performance.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENTS

Figure 1:
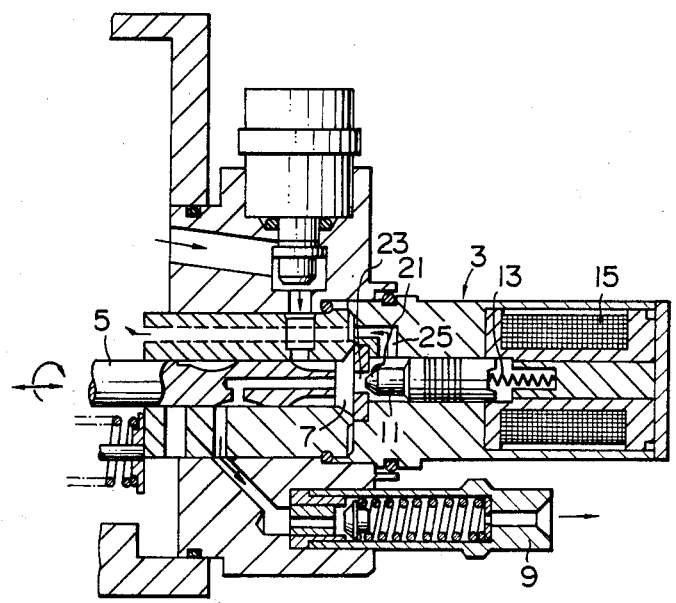
FIG. 1 relates to the prior art, and shows in longitudinal section an electromagnetic valve for fuel spilling of a conventional sort as used in a conventional type of diesel fuel injection pump.

The present invention will now be described with reference to the preferred embodiments thereof, and with reference to the appended drawings. Referring to FIG. 2, which shows the first preferred embodiment, this diesel fuel injection pump 1 is an electromagnetic spilling type distribution type fuel injection pump, and comprises a drive shaft 2 adapted to be driven by a crankshaft, not particularly shown, of a diesel engine, which is partially shown in sectional view in the figure, in a predetermined phase relationship thereto. The diesel engine to which this exemplary first preferred embodiment is to be fitted is in fact a four cylinder four stroke diesel engine. The drive shaft 2 drives a vane type feed pump 4 (shown in a plane section in FIG. 1 which is at 90° to the general plane of the figure), which feeds diesel fuel supplied via a fuel supply connection 54 and, by the control of a venting pressure control valve 58, under a moderate pressure (which is representative of the rotational speed of said vane pump 4 and thus of the rotational speed of the drive shaft 2 and of the diesel engine) through a passage 59 to a large fuel chamber 30 defined within the housing 24 of the fuel injection pump 1, fuel in said large fuel chamber 30 being vented, when appropriate, via a fuel return connection 56 incorporating a proper orifice passage. The drive shaft 2 has mounted at an intermediate position on it a signal rotor 6, having a plurality of teeth formed thereon, and is at its right end in the figure formed with a coupling shape 8. An electromagnetic pickup 60 is mounted to a roller ring 14 described later in the housing 24 opposing the teeth of the signal rotor 6 for producing electrical signals regarding the angular position of the drive shaft 2 when the teeth of said rotor 6 pass it. A generally cylindrical plunger 12 is mounted with its central axial line coincident with the central axis of the drive shaft 2, and its left end in the figure is formed in a coupling shape which fits together with the coupling shape 8 of the drive shaft 2 so that the plunger 12 is rotationally coupled to the drive shaft 2 while being free to move axially with respect thereto. The cylindrical right end in the figure of the plunger 12 is closely and cooperatingly fitted into a cylindrical bore formed in a boss portion 11 fitted in the pump housing 24 and can slide and rotate freely in said bore; and the plunger 12 is biased to the left in the figure by a compression coil spring 13 and a collar 13a fitted on a flange shaped portion 12a of the drive shaft 2 and associated spring receiving elements, etc.

A cam plate 10 is fixedly secured around the left hand end in the figure of the plunger 12 and rotates integrally therewith, and the left hand side of this cam plate 10 is formed in an axial circular cam shape bearing a plurality of convex and concave cam portions, the convex ones being designated in the figure by the symbol 10a. The roller ring 14, which as mentioned above supports the electromagnetic pickup 60, is rotatably mounted to the housing 24 of the fuel injection pump, around the coupling shape 8 and mutually concentric therewith, and is provided with a plurality of cam rollers 16 rotatably mounted along the outer circumferential part of its right hand side in the figure, bearing against the cam plate 10, with the central rotational axis of each of said cam rollers 16 extending radially perpendicular to the central axis of the drive shaft 2. The number of the cam rollers 16 and the number of the convex cam portions 10a are such that, as the plunger 12 and the cam plate 10 rotate through one full revolution with respect to the roller ring 14, the cam action of the cam portions 10a on the rollers 16 causes the plunger 16 to be reciprocated axially to and fro by the same number of times as the number of cylinders of the diesel engine. Thus, in the shown exemplary first preferred embodiment which is a fuel injection pump for a four cylinder diesel engine, there are provided four equally spaced cam rollers 16 and four equally spaced convex cam portions 10a (although some of both of these are not visible in the figure). The roller ring 14 is rotatably mounted to the pump housing 24, and its angular position is variably controlled with respect thereto by a timer 18, schematically shown in a plane section at 90° to the general plane of the figure, and this timer 18 comprises a timer piston 22 slidably mounted in a bore formed in the pump housing 24 and a pin 20 radially mounted to the roller ring 14 and engaged at its free end portion with the timer piston 22 so as to be rotationally turned and to rotationally position said roller ring 14. The timer piston 22 is biased in its rightwards axial direction in the figure as viewed in said 90° turned plane section by a compression coil spring 26 mounted between its left hand end in the figure and the corresponding end of its bore, and is biased in the leftwards axial direction by the output pressure of the vane pump 4, which is supplied via passages 57a and 57b to a chamber 19 defined at the right hand end in the figure of said bore, in such a manner that the axial movement of the timer piston 22 leftward in the figure is representative of the rotational speed of the crankshaft of the engine, and drives the roller ring 14 to rotate it in the direction opposite to the rotational direction of the drive shaft 2 so as to advance the fuel injection timing by an amount determined by the output pressure of the vane pump 4, i.e. determined by the revolution speed of the crankshaft of the diesel engine.

Figure 2:
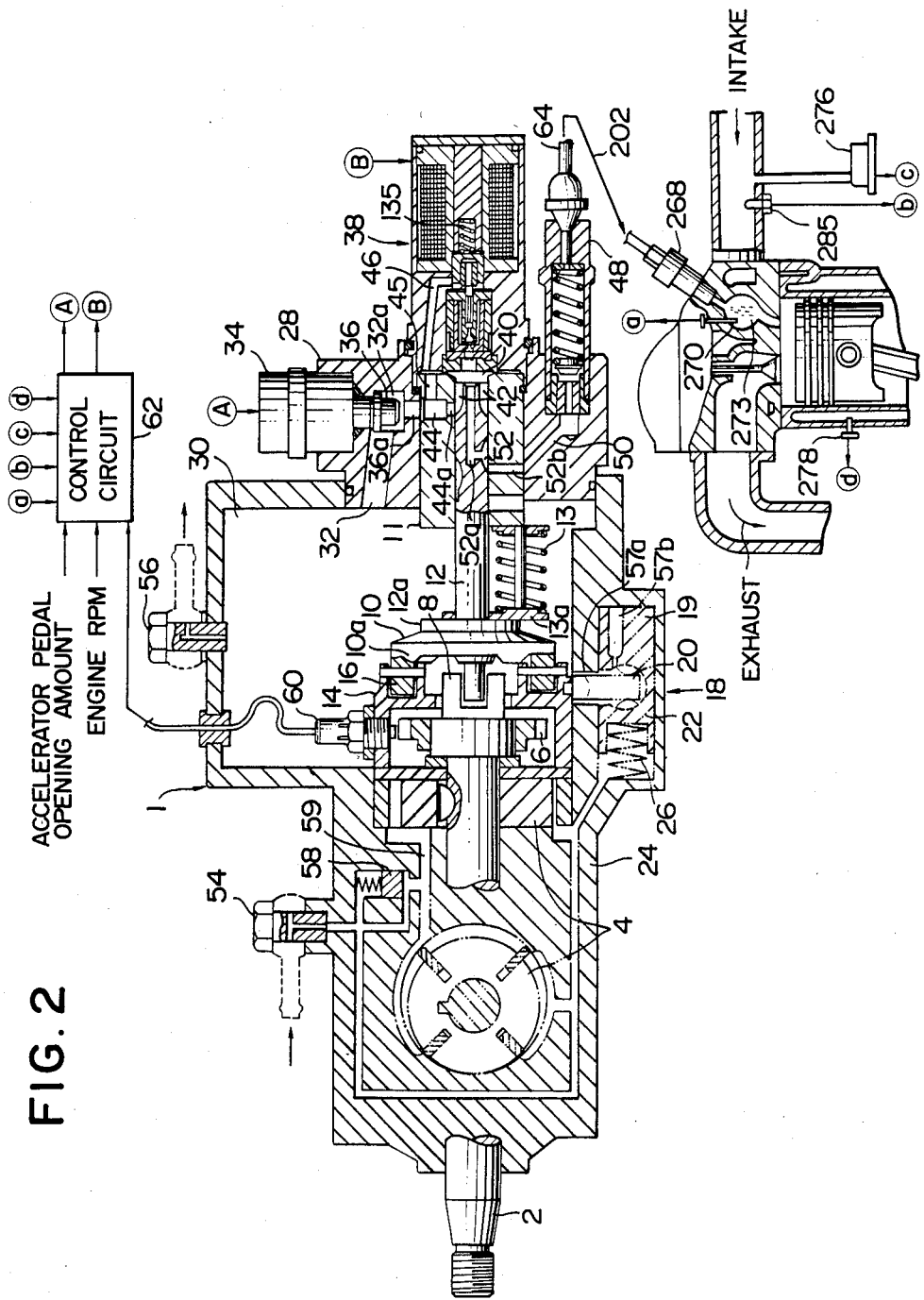
FIG. 2 is a sectional longitudinal view, in part 90° expansion, of the first preferred embodiment of the diesel fuel injection pump of the present invention, also showing a section of the diesel engine to which it is fitted.

On the right hand side in FIG. 1 of the fuel injection pump 1 there is mounted in the housing 24 a block 28, in which the aforementioned boss 11 is fitted. A fuel passage 32 leads from the large fuel chamber 30 to an intermediate fuel chamber 32a defined within the block 28, and a passage 44 leads from said intermediate fuel chamber 32a to a fuel supply port 44a which opens in the side surface of the cylindrical bore in the boss 11 in which the plunger 12 reciprocates. An electromagnetic valve 34 for fuel shutting off is provided, and a valve element 36 of this valve 34 is so constructed and arranged that: when the solenoid coil (not particularly shown) of the electromagnetic valve 34 is supplied with actuating electrical energy, its valve element 36 is moved upwards in the figures away from the upper end 36a of the passage 44, thus opening said upper end 36a and allowing communication between the passage 32 and the passage 44; but, on the other hand, when said solenoid coil of this electromagnetic valve 34 for fuel shutting off is not supplied with actuating electrical energy, its valve element 36 is moved downwards by the action of a spring (likewise not particularly shown) towards said upper end 36a of the passage 44 and blocks it, thus interrupting communication between the passage 32 and the passage 44.

The outer cylindrical surface of the right hand end of the plunger 12 is formed with a plurality of axially extending grooves 42, which are equally spaced around said plunger 12 and reach its end and whose number is the same as the number of cylinders of the diesel engine and which are arranged sometimes one or other to coincide with the fuel supply port 44a, according to rotation and reciprocation of the plunger 12; and a central axial hole 52a is formed along the axis of said plunger 12, one end of said hole 52a opening to the right hand end surface of the plunger 12 and the other end of said hole 52a opening to a side notch port 52 provided on the outer cylindrical surface of an intermediate portion of the plunger 12. A plurality of delivery valves 48 in number the same as the number of cylinders of the diesel engine are mounted in the block 28 (only one of the valves 48 with its associated arrangements is shown in FIG. 1 for the purposes of simplicity), and the inlet of each of these delivery valves 48 is selectively supplied with diesel fuel via a passage 50 which leads to a fuel receiving port 52b which opens in the side surface of the cylindrical bore in the boss 11 in which the plunger 12 reciprocates; the ports 52b are equally spaced around the plunger 12 and also are in number the same as the number of cylinders of the diesel engine, i.e. are four in number in this shown first preferred embodiment. Each of the delivery valves 48 is connected via a high pressure fuel pipe 202 to a fuel injector 268 fitted in a corresponding one of the cylinders of the diesel engine, for supplying diesel fuel under high pressure thereto at an appropriate amount and timing. The side notch port 52 is arranged to sometimes coincide with one or other of the fuel receiving ports 52b, also according to rotation and reciprocation of the plunger 12.

A high pressure chamber 40 is defined between the right hand end of the plunger 12 and an electromagnetic valve for fuel spilling 38 fitted to the block 28 and closing the end of the cylindrical bore in the boss 11 in which said plunger 12 reciprocates, in cooperation with the cylindrical side surface of said bore, with the ends of the notches 42 and the end of the central hole 52a in the plunger 12 communicating to this high pressure chamber 40; and this electromagnetic valve for fuel spilling 38 regulates escape of fluid from the high pressure chamber 40. The fuel vent passage 46 of this electromagnetic valve for fuel spilling 38 is communicated, via an intermediate passage 45 formed in the boss 11, to an intermediate point, downstream of the electromagnetic valve 34 for fuel shutting off, on the fuel supply passage 44 leading from the intermediate fuel chamber 32a to the fuel supply port 44a in the side surface of the bore of the plunger 12.

Figure 3:
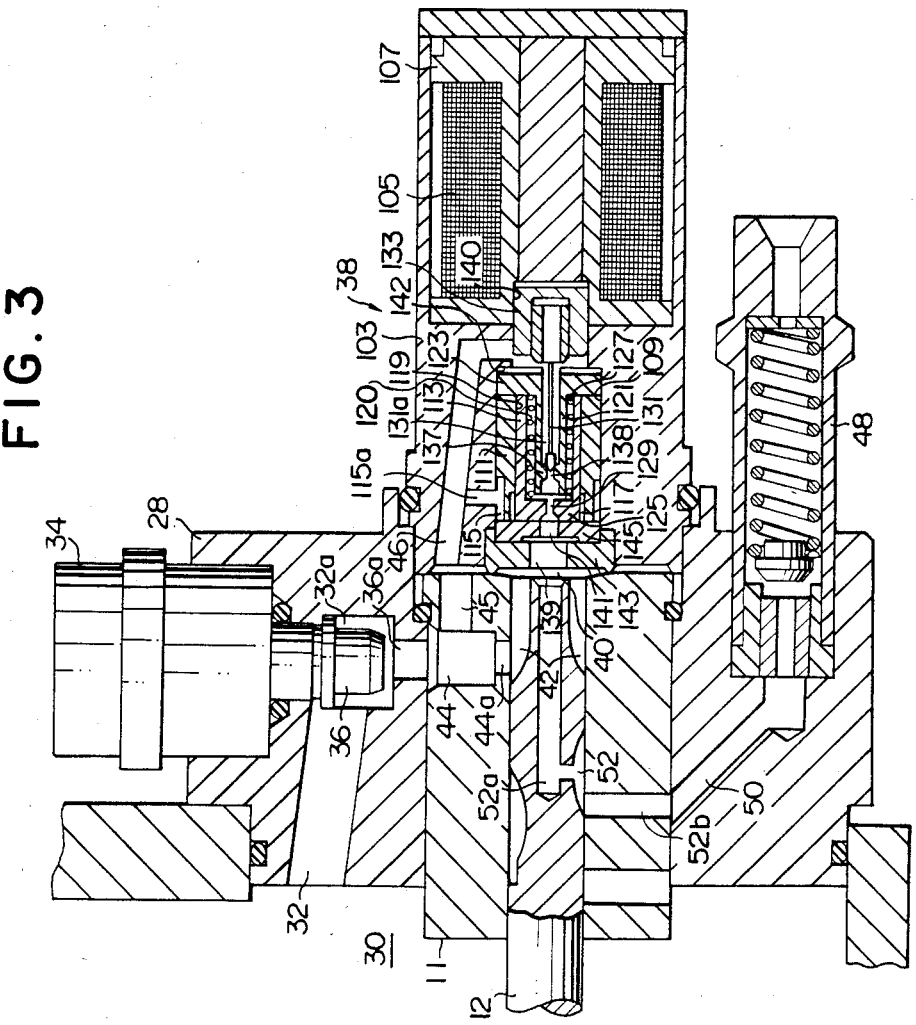
FIG. 3 is an enlarged sectional view of a right hand side part from the point of view of FIG. 2 of said first preferred embodiment, taken in the same sectional plane as FIG. 2 and particularly showing the construction of a high pressure chamber and an electromagnetic fuel spilling valve.

Referring more particularly to FIG. 3 which shows an enlarged view, the electromagnetic valve for fuel spilling 38 comprises a housing 103 in which the return passage 46 mentioned above is formed, and an iron core 107 if fitted in this housing 103 and has an electromagnetic coil 105 wound around it. A cylindrical bore 109 of relatively large diameter formed in the valve housing 103 has a first cylindrical piston 111 fitted therein so as to be reciprocable along the axis thereof. The first piston 111 is hollow and has a cylindrical bore 119 formed along its axis, and a second cylindrical piston 113 is fitted in this bore 119 so as to be reciprocable along the axis of the first piston 111. And this second piston 113 is also hollow and has a cylindrical bore 120 formed along its axis, and a third cylindrical piston 121 is loosely fitted in this bore 120 with a certain gap being left therebetween so as to be reciprocable along the common axis of the first and second pistons 111 and 113. The left hand end portion in the figure of the first piston 111 towards the high pressure chamber 40 is reduced with regards to its outer diameter so as to define a relatively thin cylindrical space 115 between said end portion of said piston 111 and its bore 109 formed in the housing 103, and this space 115 is communicated via a passage 115a with an intermediate point on the return passage 46. And also this left hand end portion of the first piston 111 towards the high pressure chamber 40 is increased with regards to its inner diameter so as to define a relatively thin cylindrical space 117 between said end portion of said piston 111 and the outer circumferential surface of the second piston 113.

A compression coil spring 127 is fitted around the third piston 121, between its outer surface and the inner surface of the bore 120 in the second piston 113 in which said third piston 121 is loosely fitted, and the ends of this compression coil spring 127 bear on a large diameter flange 123 formed on the right hand end of the third piston 121 and on the bottom 125 of the bore 120, so as to bias the third piston 121 rightwards relative to the second piston 113 as seen in the figure. A hole 129 is formed through this bottom 125 of the bore of the second piston 113 so as to communicate the internal space within the bore 120 with the high pressure chamber 40 which axially opposes these three pistons 111, 113, and 121 fitted inside one another through below mentioned holes 139 and 141. A movable member 133 is slidably fitted in a bore 140 in the iron core 107, coaxial with and axially opposing the three pistons 111, 113, and 121, and a valve needle 131 is crimped to the movable member 133 and extends axially leftwards therefrom into a bore 131a formed along the central axis of the third innermost piston 121, and the end of this valve needle 131 cooperates with a valve seat 137 formed in this bore 131a, so as selectively either to open or close a hole 138 in said valve seat 137 according as the valve needle 131 is pushed against this valve seat 137 or not and thus to selectively open or close the bore 131a. The right hand end of the bore 131a is communicated to the end of the return passage 46. The axial positions of the three pistons 111, 113, and 121 are determined, within certain small limits, by the flange 123 of the third piston 121 to abut an annular right end 142 of the cylindrical bore 109 on the right, and by two washers 143 and 145 on the left, said two washers 143 and 145 having respective holes 139 and 141 formed in them so that the left end of the bore 131a of the third piston 121 is communicated with the high pressure chamber 40.

Thus, when electrical energy is supplied to the coil 105, then the iron core 107 is magnetized, and in this state the magnetic force thereof biases the movable member 133 and the valve needle 131 crimped thereto leftwards in the figure, so that the end of the valve needle 131 closes the hole 138 in the valve seat 137, and this seals off the high pressure chamber 40 from the return passage 46. On the other hand, when no actuating electrical energy is supplied to the coil 105, then the iron core 107 is not magnetized, and then by the pressure present in the high pressure chamber 40 the movable member 133 and the valve needle 131 crimped thereto are pushed thereby rightwards in the figure, so that the end of the valve needle 131 opens the hole 138 in the valve seat 137, and this opens a relatively small and restricted opening from the high pressure chamber 40 to the return passage 46, allowing a relatively small flow of fluid out from the pressure chamber 40. At this time, the third piston 121 is displaced rightwards relative to the first piston 111, and the second piston 113 is also displaced rightwards relative to the first piston 111 due to the pressure difference between the two sides of its bottom 125. Due to this lifting of the second piston 113 relative to the first piston 111, high pressure fuel from the high pressure chamber 40 flows into relatively thin cylindrical space 117, thereby displacing the first piston 111 to the right relative to the housing 103 of the valve, and thus causing the result that a relatively large flow of fluid is allowed to pass out from the pressure chamber 40 to the return passage 46 through an annular space formed between the washer 143 and the left end of the first piston 111, the cylindrical space 115, and the passage 115a.

As will be particularly descanted upon later, by the provision of this construction for the electromagnetic valve 38 for fuel spilling including the relatively small pilot needle valve construction which when operated electromagnetically causes a fluid pressure to be generated which then causes the piston 113 and 111 and the main valve to operate automatically, the responsiveness of this electromagnetic valve 38 is very greatly improved, as compared with that of a conventional type of electromagnetic valve for fuel spilling such as shown in FIG. 1 and explained in the part of this specification entitled "BACKGROUND OF THE INVENTION". This means that a process of pilot fuel injection and subsequent main fuel injection, which will be described hereinafter, is possible to be provided, by using this novel form of quickly responsive valve. Further, the amount of electrical energy consumed by the electromagnetic valve 38 for fuel spilling is much reduced, thus simplifying the control circuitry for it; and also its compactness, lightness, and cheapness are improved.

The delivery valve 48 is connected, via a conduit 202, to a fuel injection valve 268 which is fitted to one of the cylinders of the diesel engine. In fact, in this exemplary construction, the fuel injection valve 268 is fitted to a secondary combustion chamber 273 for this cylinder. Also to this secondary combustion chamber 273 is fitted an ignition sensor 270, projecting into said secondary combustion chamber 273, capable of providing an electrical output signal indicative of the onset of combustion (i.e. of ignition) within the secondary combustion chamber 273. This ignition sensor 270 may, for example, comprise a fiber optic guide and a phototransistor which produces an electrical output signal representative of the amount of electromagnetic radiation transmitted to it by said fiber optic guide from the interior of the secondary combustion chamber 273.

Further, an accelerator pedal depression amount sensor (not particularly shown) provides an electrical output signal representative of accelerator pedal depression amount, i.e. of engine load; an intake manifold pressure sensor 276 provides an electrical output signal representative of the pressure in the intake manifold of the diesel engine; an intake manifold temperature sensor 285 provides an electrical output signal representative of the temperature in the intake manifold of the diesel engine; and a water temperature sensor 278 provides an electrical output signal representative of the temperature of the cooling water of the diesel engine. The electrical output signals of the sensor 60 of the fuel injection pump 1, of the accelerator pedal depression amount sensor, of an appropriate engine revolution speed sensor (also not particularly shown; this function may in fact be provided by the sensor 60), of the intake manifold pressure sensor 276, of the intake manifold temperature sensor 285, of the ignition sensor 270, and of the water temperature sensor 278, are fed into a microcomputer incorporated in a control circuit 62 for the fuel injection pump 1; and the solenoids of the electromagnetic valve for fuel spilling 38 and of the electromagnetic valve 34 for fuel shutting off are fed from an output port construction of said microcomputer.

The microcomputer, not particularly shown in detail, has a central processing unit (CPU), a read only memory (ROM), a random access memory (RAM), a back up random access memory (BU-RAM), an I/O port, an analog/digital converter (ADC), and a bus which interconnects these elements, and so on. The analog/digital converter converts the analog output signals from the accelerator pedal depression amount sensor, the intake manifold pressure sensor 276, the ignition sensor 270, the intake manifold temperature sensor 285, and the water temperature sensor 278 into digital signals under the control of the CPU. The read only memory (ROM) has permanently stored in it a control program concerning fuel injection amount and so on, which includes subroutines which will be described later, as well as various constants and other data, including a table of fuel injection timing (or spill angle) as determined from fuel injection amount and engine rotational speed, as will be explained in more detail shortly. The control circuit 62, as a whole, performs control of fuel injection amount and other matters according to these signals as will be described hereinafter, by supplying control electrical signals to the electromagnetic valves 34 and 38. The output signal from the sensor 60, which already is of a digital nature, is fed directly to the I/O port of the microcomputer. The control circuit 62 outputs a control signal to the electromagnetic valve 34, and also supplies an ON/OFF signal for controlling the electromagnetic valve 38 for fuel spilling, i.e. a fuel injection amount control signal, to the solenoid coil 105 of the valve 38.

Now, the action of this fuel injection pump 1 during operation of the diesel engine will be described. When the engine is running and the crankshaft (not shown) of said engine is rotating, the drive shaft 2 is rotated in synchrony therewith and at a predetermined phase in relation thereto (actually at half crankshaft speed, because this is exemplarily a pump for a four stroke diesel engine), and drives the vane pump 4, and fuel pressurized to the output pressure of said vane pump 4, which is representative of the rotational speed of said drive shaft 2 and of said crankshaft of the engine, is fed into the chamber 30 and into the fuel passages 32 and 44 and also into the actuating chamber 19 of the timer assembly 18, so as to cause the timer piston 22 to be driven leftwards in the figure (90° plane section) by an amount corresponding to said rotational speed of said engine, thus rotating the roller ring 14 and the rollers 16 mounted thereon by a similarly corresponding amount from their starting rotational positions relative to the housing 24 in the direction opposite to the rotational direction of the drive shaft 2. Meanwhile, as the drive shaft 2 and the plunger 12 rotate in synchronism with one another, and as the cam plate 10 is also rotated, the cam projections 10a are caused to ride up and down the rollers 16, so as to reciprocatingly drive the plunger 12 against the biasing force of the compression coil spring 13 leftwards and rightwards in the figure at appropriate timing governed by the aforesaid rotational positon of the roller ring 14, as said plunger 12 also rotates, i.e. according to the rotational speed of the diesel engine, with the plunger 12 making one complete rotation for every two rotations of the crankshaft of the diesel engine, in this exemplary case of a four stroke type diesel engine. While the master running or ignition switch of the vehicle is turned on while the diesel engine is running normally, actuating electrical energy is being supplied to the electromagnetic valve 34 for fuel shutting off, and so its valve element 36 is displaced from the valve seat 36a and the fuel passage 32 is in communication with the fuel passage 44. Therefore, on each of the suction or leftward strokes of the plunger 12 when one of the notches 42 is corresponding to the fuel supply port 44a which opens in the side surface of the cylindrical bore in the boss 11, diesel fuel at relatively low pressure is sucked into the high pressure chamber 40 from the chamber 30 through said fuel passages 32 and 44.

When thereafter the plunger 12 moves rightwards during its subsequent compression stroke, by the rotation of said plunger 12 said one of the notches 42 is no longer corresponding to the fuel supply port 44a, and accordingly back flow of diesel fuel to the passage 44 is prevented; and also the side notch port 52 is now coinciding with an appropriate of the fuel receiving ports 52b, also according to rotation of the plunger 12, so as to direct diesel fuel which is now being compressed in the high pressure chamber 40 by the rightward movement of the plunger to the appropriate one of the fuel delivery valves 48, via the hole 52a and said side notch port 52, so as to be injected into the appropriate cylinder of the engine via the relevant fuel injection valve 48, according to the per se well known distribution function of this fuel injection pump. However, this compression process of the diesel fuel within the high pressure chamber 40, the injection thereof through the fuel delivery valve 48, only will take place if the coil 105 of the electromagnetic valve for fuel spilling 38 is being provided with actuating electrical energy and thus said valve 38 is closed, as will be explained in detail shortly, and thus is preventing communication between the high pressure chamber 40 and the vent passage 46. On the other hand, when actuating electrical energy is not being provided to said coil 105 of the valve 38, then said valve 38 is opened, as will be explained in detail shortly, thus opening said hole, and thereby the high pressure chamber 40 is communicated with the vent passage 46, thus venting the compressed diesel fuel in the chamber 40 back to an intermediate portion of the passage 44 to which said vent passage 46 communicates, and thereby cutting off fuel injection. During normal running of the diesel engine, the control circuit 62 ceases to supply actuating electrical energy to the electromagnetic valve for fuel spilling 38 at an appropriate timing point during each fuel injection stroke of the plunger 12, so as to open said valve 38 and to cut off further fuel injection during this plunger stroke, according to the various signals regarding engine operational parameters which said control circuit 62 receives from its various sensors described above, as will shortly be described: this is how the amount of fuel injectingly supplied to the diesel engine, and thereby the load on said diesel engine, is controlled. This action of the control circuit 62 in venting the high pressure chamber 40 at an appropriate timing point is analogous to the operation of a spill ring in a conventional type of diesel fuel injection pump. When the diesel engine is running and it is desired to stop it from running, the master running switch of the vehicle is turned off by the operator, and this immediately causes stopping of supply of electrical energy to the electromagnetic valve 34 for fuel shutting off, so that its valve element 36 is moved against the valve seat 36a by the force of its biasing spring (not particularly shown) and communication between the fuel passage 32 and the fuel passage 44 is interrupted. Therefore, supply of new fuel to the diesel engine is terminated, and accordingly quickly the diesel engine comes to a halt.

Figure 4:
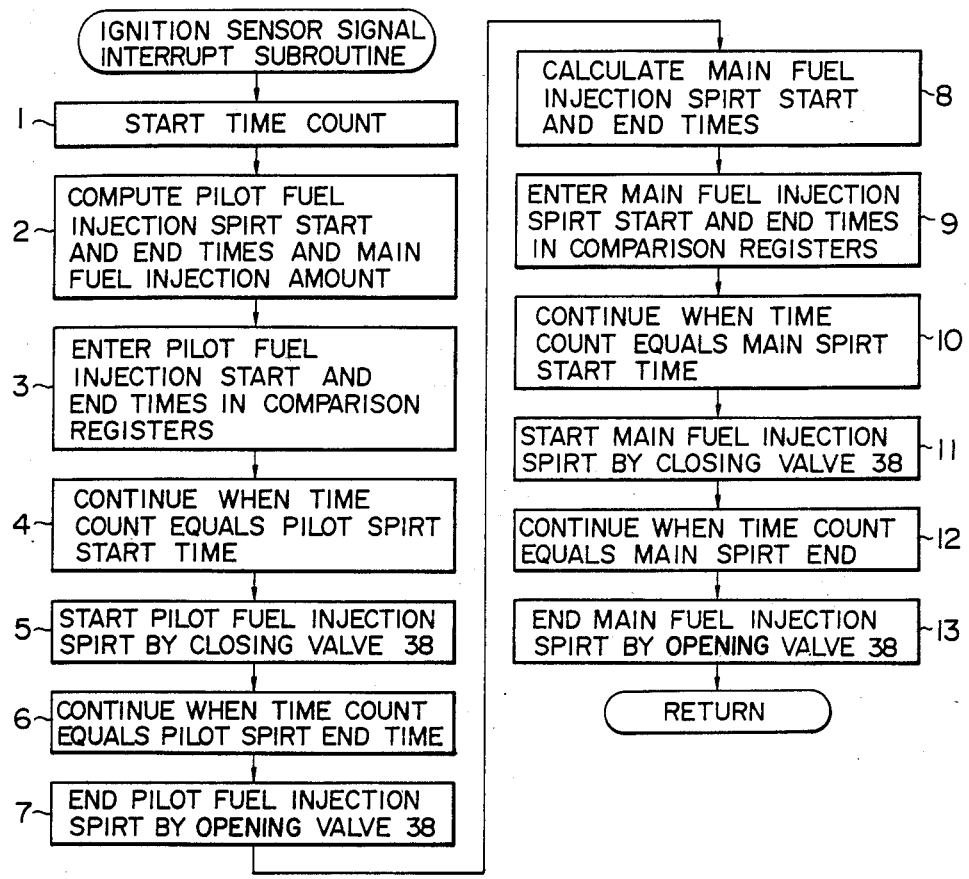
FIG. 4 is a flow chart showing a main fuel injection control routine stored in said microcomputer.
Figure 5:
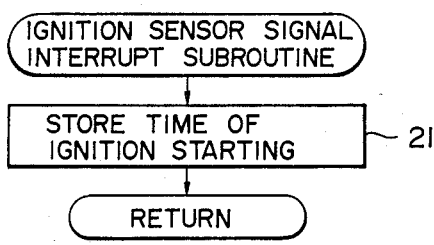
FIG. 5 is a flow chart showing an ignition interrupt subroutine stored in said microcomputer.
Figure 6:
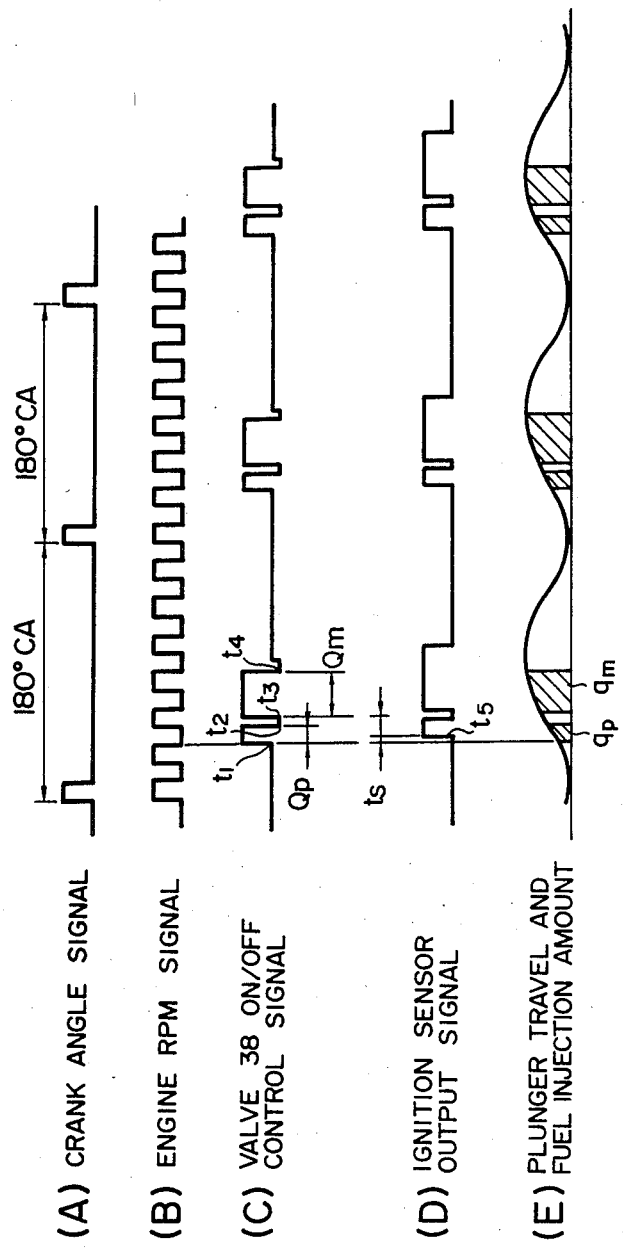
FIG. 6 is a set of timing charts showing various signals which are input and output to said microcomputer during engine operation, along with fuel injection amounts.
Figure 7:
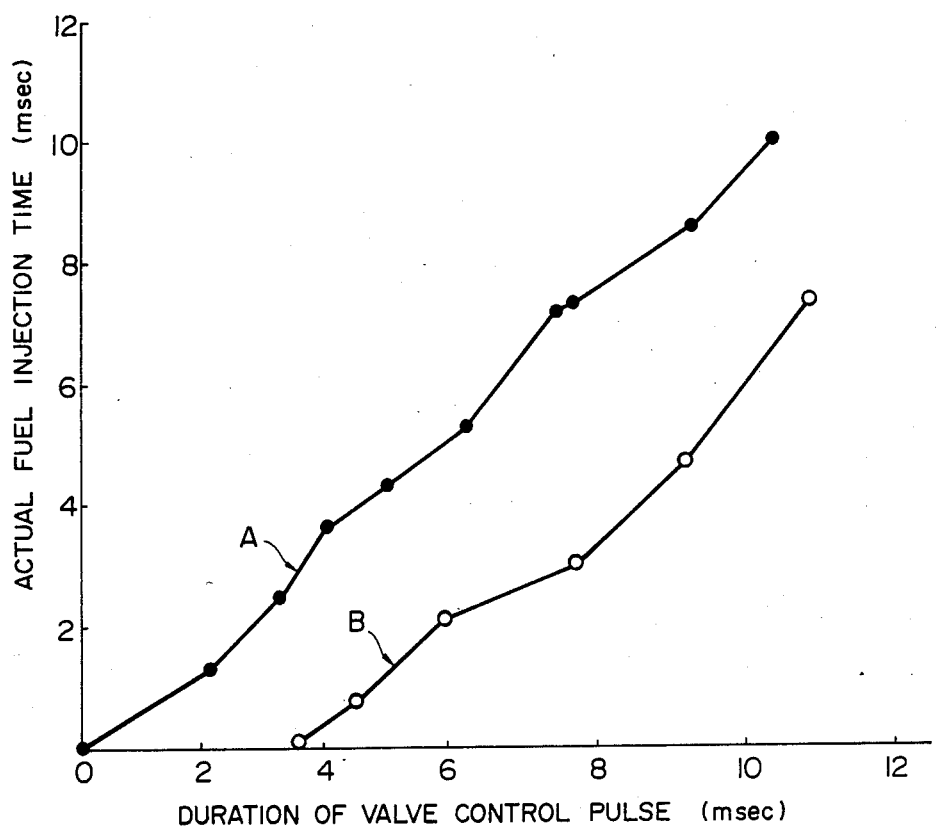
FIG. 7 is a graph, showing on the horizontal axis the duration in milliseconds of an electrical ON/OFF pulse used for controlling in electromagnetic fuel spilling valve, and showing on the vertical axis the duration in milliseconds of the actual fuel injection pulse obtained as a result from the pump incorporating this valve, for use in evaluating the responsiveness of the valve, both with regard to the prior art fuel spilling valve of FIG. 1 and with regard to the fuel spilling valve used in the pump according to the first preferred embodiment of the present invention shown in FIGS. 2 and 3.

Now, how the microcomputer incorporated in the control circuit 62 determines the timings and amounts of fuel to be injected in each injection spirt to each cylinder of the engine, in other words how said microcomputer determines the time for energizing the electromagnetic valve 38 to initiate each spirt of and for deenergizing the electromagnetic valve 38 to spill fuel so as to terminate each spirt of fuel injection, will be particularly described, with reference to the program flow charts of FIGS. 4 and 5, and with reference to the timing chart of FIG. 6 and the graph of FIG. 7.

FIG. 4 shows the flow chart of the main fuel injection control program of this microcomputer. In the step 1 of this program, the time count is started, when for example a crank angle signal as shown in FIG. 6a is received by the microcomputer. Next, in the step 2, from engine operational parameters such as the engine rotational speed as calculated from the output signal of the engine rotational speed sensor (which may be the same as the sensor 60) and the accelerator pedal opening amount as detected by the accelerator pedal opening amount sensor, and possibly also using data from the other sensors such as the engine temperature sensor 278 and so on, the amounts of fuel to be injected both in the pilot fuel injection spirt (to be referred to as $q_p$, which corresponds to a fuel injection time period $Q_p$; see FIG. 6e) and in the main fuel injection spirt (to be referred to as $q_m$, which corresponds to a fuel injection time period $Q_m$; also see FIG. 6e) are calculated, and also the proper start and end times (respectively to be referred to as $t_1$ and $t_2$; see FIG. 6c) for the pilot fuel injection spirt are calculated; but the start and end times (respectively to be referred to as $t_3$ and $t_4$; see FIG. 6c) for the main fuel injection spirt are not determined as yet. The manner in which these fuel injection amounts $q_p$ and $q_m$ and times $t_1$ and $t_2$ are determined will not be particularly described herein, because such calculations are per se well known in various forms. For example, these values could be calculated by interpolation from tables stored in the ROM of the microcomputer. Next, in the step 3, these start and end times $t_1$ and $t_2$ for the pilot fuel injection spirt are entered into a special comparison register in the memory of the microcomputer. Next, in the step 4, the program continues when the time count becomes equal to this set pilot injection spirt start time $t_1$, and in the step 5 the electromagnetic valve 38 for fuel spilling is closed by starting of the supply of actuating electrical energy thereto, i.e. the injection of diesel fuel to the combustion chamber for this pilot fuel injection spirt is started by the termination of the spilling of the fuel in the high pressure chamber 40 which now starts to be compressed.

At some time subsequent to this time point, the ignition interrupt subroutine of FIG. 5 is automatically initiated, upon the rise of the output signal of the ignition sensor 270 which causes an interrupt of the main program of FIG. 4, indicating the start of combustion in the combustion chamber. At this time, in the step 21, the time $t_5$ when this start of combustion occurred is stored in a predetermined location in the RAM of the microcomputer, and then the ignition interrupt subroutine returns.

Subsequent to this time point $t_5$, in the step 6, the main program continues when the time count becomes equal to the set pilot injection spirt end time $t_2$, and in the step 7 the electromagnetic valve 38 for fuel spilling is opened by the stopping of the supply of actuating electrical energy thereto again, i.e. the injection of diesel fuel to the combustion chamber is terminated by the starting of the spilling of the fuel in the high pressure chamber 40 which now is ceased to be compressed. Next, in the step 8, the start and end times $t_3$ and $t_4$ for the main fuel injection spirt are calculated, by this start time $t_3$ being taken as a time which is later than the actual fuel ignition time $t_5$ of the pilot fuel injection spirt by a certain predetermined time interval $t_s$ (see FIGS. 6c and 6d), and by the end time $t_4$ being calculated based on this start time $t_3$ and on the amount of fuel $q_m$ to be injected in this main fuel injection spirt. Next, in the step 9, these start and end times $t_3$ and $t_4$ for the main fuel injection spirt are entered into the comparison register in the memory of the microcomputer. Next, in the step 10, the program continues when the time count becomes equal to this set main injection spirt start time $t_3$, and in the step 11 the electromagnetic valve 38 for fuel spilling is closed by starting of the supply of actuating electrical energy thereto, i.e. the injection of diesel fuel to the combustion chamber for this main fuel injection spirt is started by the termination of the spilling of the fuel in the high pressure chamber 40 which now starts to be compressed. At some time subsequent to this time point, again the ignition interrupt subroutine of FIG. 5 is automatically initiated, when the ignition of this main fuel injection spirt starts; but this is irrelevant to the operation of the microcomputer. Subsequent to this time point, in the step 12, the main program continues when the time count becomes equal to the set main injection spirt end time $t_4$, and in the step 13 the electromagnetic valve 38 for fuel spilling is opened by the stopping of the supply of actuating electrical energy thereto again, i.e. the injection of diesel fuel to the combustion chamber is terminated by the starting of the spilling of the fuel in the high pressure chamber 40 which now is ceased to be compressed. Then the main fuel injection amount calculation program returns.

Thus, it is seen that by this operation first the amounts of fuel $q_p$ and $q_m$ for the pilot fuel injection spirt and the main fuel injection spirt are calculated, according to the operating conditions of the engine. These correspond to the shaded areas under the graph (i.e. the time integral) of FIG. 6e, the vertical axis on which shows the travel of the plunger 12. Next, the start of the pilot fuel injection spirt is made at a predetermined time point $t_1$, and its end is also made at a subsequent predetermined time point $t_2$. This pilot fuel injection spirt is provided into the combustion chamber, to get combustion started well therein. During the injection of the pilot spirt, the ignition sensor 270 outputs a signal indicating the actual start of ignition of the pilot fuel, and then the microcomputer calculates the time for the start of injection of the main fuel injection spirt as being a predetermined time $t_s$ later than this ignition start time. And the microcomputer calculates the time for the end of injection of the main fuel injection spirt from its start time and the actual amount $q_m$ of fuel required in this main spirt.

Since the pilot fuel injection spirt, as schematically shown in FIG. 6c, is of relatively short time duration, it will be understood that the performance requirements for the electromagnetic valve 38 for fuel spilling, in terms of speed and accuracy of response, are rather severe. Hence, as explained earlier in this specification, they would not easily be fulfilled by a conventional sort of electromagnetically controlled fuel flow control valve such as the prior art valve shown in FIG. 1. However, by the use of the type of fuel flow control valve shown and described above, sufficiently high performance can be attained. FIG. 7 shows the performance, in terms of actual fuel injection time obtained against duration of the electrical pulse for valve control supplied to its solenoid coil, of a fuel flow control valve 38 for fuel spilling of the type shown above by the line A, and also shows the performance of a prior art FIG. 1 type of valve by the line B. These graphs were obtained by experiment. It will be understood from these graphs that the conventional valve did not provide a fuel injection amount which was properly responsive to the length of the control pulse supplied to it, when the control pulse was shorter than about 4 milliseconds, and in fact the response of this prior art valve to such short pulses was also rather erratic and unpredictable; while on the other hand the valve 38 as described above was properly responsive to very short control pulses. Further, by other experiments the results of which are not particularly shown, it was found that by roughly synchronizing the natural frequency of the motion of the movable member 133 and the needle valve attached thereto to the frequency of the control pulse, even better responsiveness could be obtained at high frequencies.

Thus it is seen that, according to the shown structure, since the pilot electromagnetic valve 38, which controls the relatively small pilot flow of fuel from the high pressure chamber 40 and accordingly is not required to be a very large valve, is the one which is required to respond to actuating electrical energy, its response time can be very quick and nimble. The immediately subsequent responsive movement of the piston member 113 to release the relatively large flow of fuel from said high pressure chamber 40 is effective for venting the pressure within the high pressure chamber 40 quickly, as soon as fuel injection into the cylinder of the engine is to be stopped. Thereby, as a whole, the electromagnetic valve 38 for fuel spilling has a high response speed, and its response characteristics are found to be adequate for its use for the type of fuel injection explained above in which a pilot fuel injection spirt is injected into the combustion chamber of the engine before the main fuel injection spirt, which is an application which has been too demanding for prior art valves. Accordingly, it has become possible to put such a type of fuel injection pump which provides such a pilot fuel injection pulse into practical use for a diesel engine. Further, this is made possible, while keeping the electromagnetic valve 38 for fuel spilling compact, and allowing it to have a small solenoid coil portion, which keeps its power requirements low, and means that the drive circuitry for such an electromagnetic valve for fuel spilling is not required to be complicated.

In FIGS. 8 through 11, details relating to a second preferred embodiment of the fuel injection pump according to the present invention are shown, in which reverse operation of the solenoid coil 105 is made in order to eradicate the consequences of magnetization of the iron core 107, etc.. In these figures, parts and blocks which correspond to part and blocks of the first preferred embodiment shown in FIGS. 2 through 5, and which have the same functions, are designated by the same reference numerals.

Figure 8:
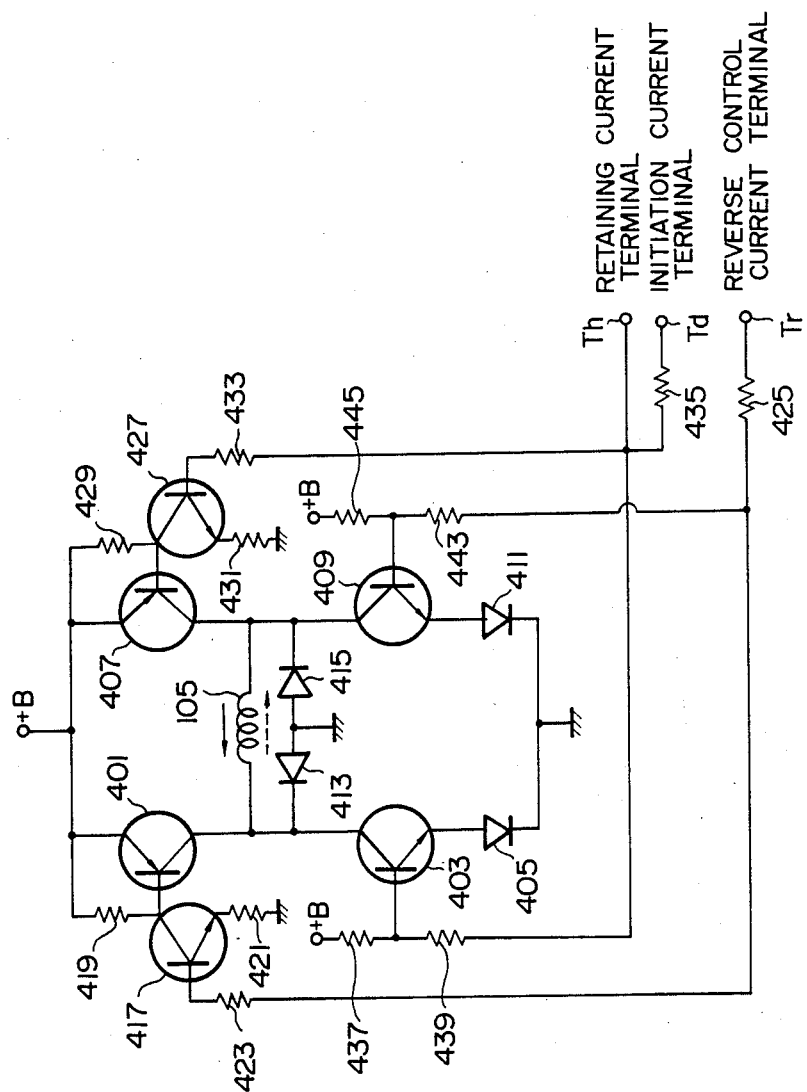
FIG. 8 is an electrical circuit diagram of a drive circuit utilized in a second preferred embodiment of the present invention for providing electric current to the solenoid of the electromagnetic valve for fuel spilling.

In this second preferred embodiment, the constructional difference is that a drive circuit as shown in FIG. 8 is provided, whereby the microcomputer in the control circuit 62 drives the solenoid coil 105 of the electromagnetic valve 38 for fuel spilling, in order to cancel the effects of residual magnetism as will be explained.

In this circuit of FIG. 8, the collectors of two transistors 401 and 403 are connected together, the emitter of the transistor 401 is connected to a voltage source +B, and the emitter of the transistor 403 is connected to ground by way of a diode 405 for protection. Likewise, the collectors of two other transistors 407 and 409 are connected together, the emitter of the transistor 407 is connected to the voltage source +B, and the emitter of the transistor 409 is connected to ground by way of a diode 411 for protection. Between the connected collectors of the transistor pairs is connected the solenoid coil 105 of the electromagnetic valve 38 for fuel spilling, and also in parallel thereto there is connected the series connection of a pair of diodes 413 and 415 for absorbing flyback, with the point where these two diodes 413 and 415 are connected together being connected to ground. The collector of a transistor 417 is connected to the base of the transistor 401 and is also connected to the voltage source +B by way of a resistor 419, and the emitter of this transistor 417 is connected to ground by way of a resistor 421 while its base is connected to a reverse control current terminal Tr by way of resistors 423 and 425. Likewise, the collector of a transistor 427 is connected to the base of the transistor 407 and is also connected to the voltage source +B by way of a resistor 429, and the emitter of this transistor 427 is connected to ground by way of a resistor 431 while its base is connected to an initiation current terminal Td by way of resistors 433 and 435. And the base of the transistor 403 is connected to the voltage source +B by way of a resistor 437 and is also connected by way of a resistor 439 to the joining point between the two resistors 433 and 435 and also to a retaining current terminal Th. A pair of resistors 443 and 445 are connected in series between the voltage source +B and the joining point between the resistors 423 and 425, and the joining point between the resistors 443 and 445 is connected to the base of the transistor 409.

Figure 9:
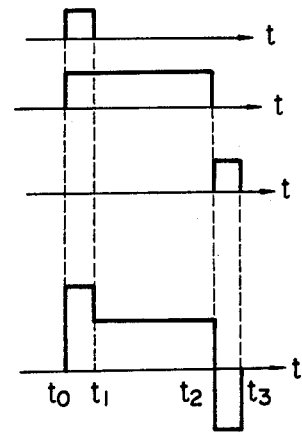
FIG. 9 is a set of timing charts showing various signals which are input to said drive circuit during engine operation, in this second preferred embodiment.
Figure 10:
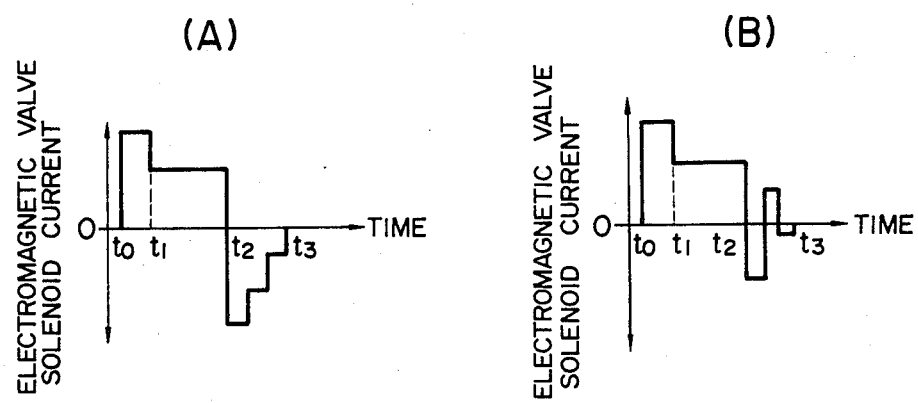
FIG. 10 is a flow chart showing a main fuel injection control routine stored in the microcomputer, in this second preferred embodiment.
Figure 11:
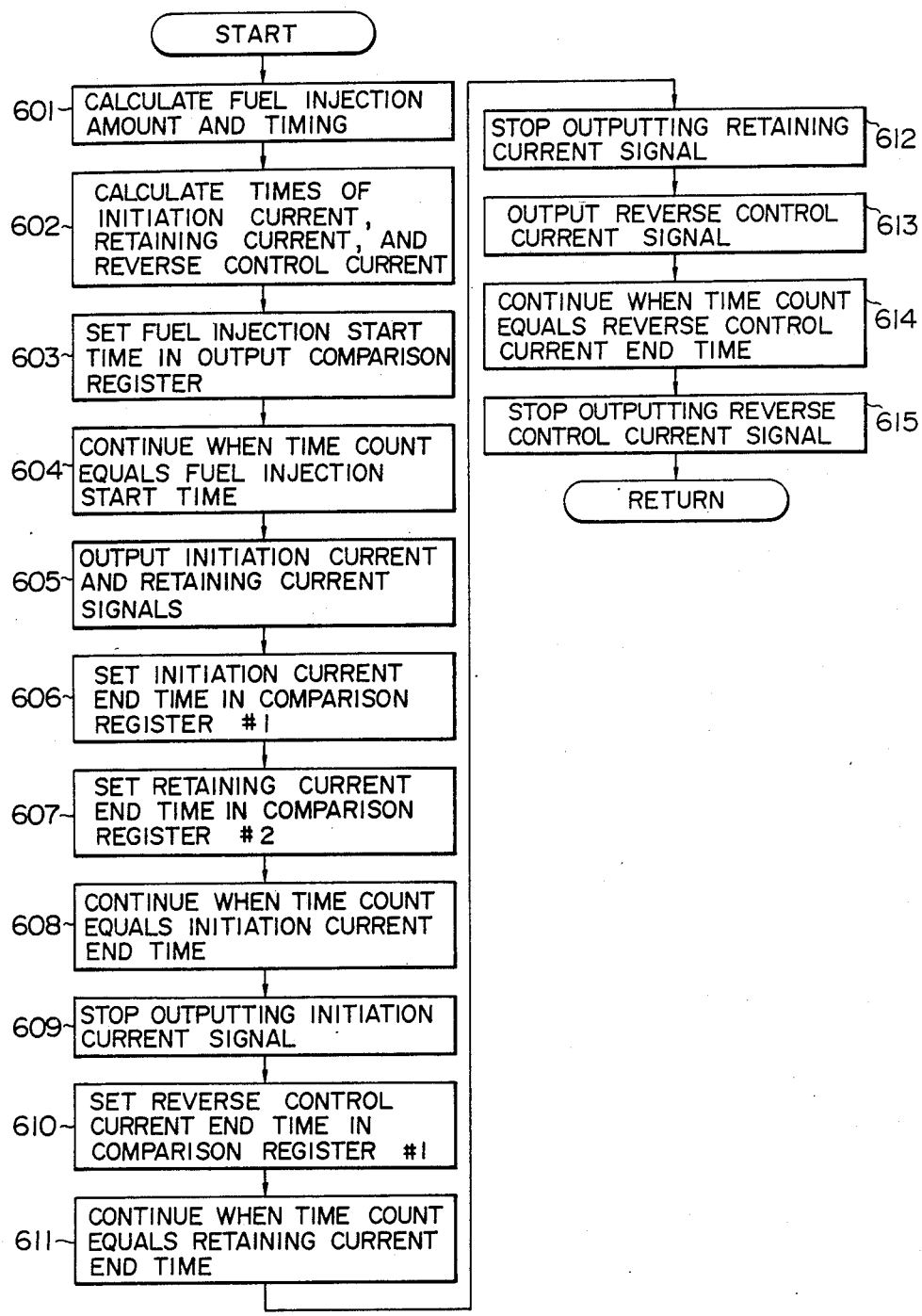
FIG. 11 is a set of timing charts showing various signals which are input and output to similar drive circuits during engine operation, in other alternative possible embodiments of the present invention.

In FIG. 9, the timings of the electric currents supplied to the control circuit of FIG. 8, along with the current supplied to the solenoid coil 105 of the electromagnetic valve 38 for fuel spilling, are shown. Here, the timing of only one cycle of these currents is shown, for one activation and deactivation of the valve 38, but of course these timings are repeated in a cyclical fashion. These timings will now be explained with reference to FIG. 11. which is a flow diagram of the main fuel injection control program performed by the microcomputer in the control device 62, in this second preferred embodiment.

In the step 601 of this program, the time count is started, when for example a crank angle signal is received by the microcomputer, and from engine operational parameters such as the engine rotational speed as calculated from the output signal of the engine rotational speed sensor and the accelerator pedal opening amount as detected by the accelerator pedal opening amount sensor, and possibly also using data from the other sensors such as the engine temperature sensor 278 and so on, the amount of fuel to be injected in the fuel injection spirt is calculated, and also the proper start and end times for said fuel injection spirt are calculated. The manner in which this fuel injection amount is determined will not be particularly described herein, because such calculations are per se well known in various forms. For example, these values could be calculated by interpolation from tables stored in the ROM of the microcomputer. Next, in the step 602, the duration times of the initiation current, the retaining current, and the reverse control current (see FIGS. 9a to 9d) are computed. Next, in the step 603, the calculated fuel injection start time T0 is set into an output comparison register. Next, in the step 604, the program continues when the time count becomes equal to this set fuel injection spirt start time, and in the step 605 the electromagnetic valve 38 for fuel spilling is closed by starting of the supply of actuating electrical energy thereto, i.e. the injection of diesel fuel to the combustion chamber for this fuel injection spirt is started by the termination of the spilling of the fuel in the high pressure chamber 40 which now starts to be compressed.

The actions performed in this step 605 will now be more particularly described with reference to FIGS. 8 and 9a through 9d. At time T0, both the initiation current and the retaining current are supplied by the microcomputer via its output port to the initiation current terminal Td and the retaining current terminal Th respectively. Thereby, the base biases of the transistors 427 and 403 become sufficiently high to turn on these transistors. (Here it should be understood that the values of all the components are so selected that all the transistors are turned off when the initiation current, the retaining current, and the reverse control current are all zero.) Since the transistor 427 turns on when the transistor 407 is turned on, there is formed a path for electric current from the electric current source +B through the collector and the emitter of the transistor 407, the solenoid 105 of the electromagnetic valve 38 for fuel spilling, the collector and the emitter of the transistor 403, and the diode 405, and then to ground. Therefore, a solenoid current as shown in FIG. 9d is supplied through the solenoid 105 in the direction indicated by a solid arrow in FIG. 8.

After this step 605 is concluded, in the step 606 the time T1 for ending of the initiation current is set into a comparison register #1, and next in the step 607 the time T2 for ending of the retaining current is set into a comparison register #2. Next, in the step 608, the program continues when the time count becomes equal to this set time T1 for ending of the initiation current in the comparison register #1, and then in the step 609 the outputting of the initiation current by the microcomputer to the initiation current terminal Td is terminated. However, since the microcomputer continues to output the retaining current to the retaining current terminal Th, the transistors 403, 427, and 407 remain in the ON state, and, to the extent that the initiation electric current has been reduced to zero, the electric current supplied to the bases of the transistors 407 and 403 decreases and the voltage between the collector and the emitter of each of the transistors 407 and 403 increases. As a result, the current through the solenoid coil 105 of the electromagnetic valve 38 for fuel spilling decreases, creating a step as shown in FIG. 9d.

After this step 609, in the step 610 the time T1 for ending of the reverse control current is set into the comparison register #1, and next in the step 611, the program continues when the time count becomes equal to the set time T2 for ending of the retaining current in the comparison register #2, and then in the step 612 the outputting of the retaining current by the microcomputer to the retaining current terminal Th is terminated. At this time, since no current is now being outputted by the microcomputer to either the initiation current terminal Td or the retaining current terminal Th of the FIG. 8 circuit, supply of current to the bases of both of the transistors 403 and 427 is terminated, and both of these transistors 403 and 427 are turned OFF, thereby cutting off the electric current which was flowing through the solenoid coil 105 of the electromagnetic valve 38 for fuel spilling.

Next, almost immediately after this retaining current end time, in the step 613 the reverse control current is supplied by the microcomputer via its output port to the reverse control current terminal Tr, and at this time the transistors 409 and 417 receive sufficient base current to be turned on, and thus the transistors 409, 417, and 401 are turned on. As a result, there is formed a path for electric current from the electric current source +B through the collector and the emitter of the transistor 401, the solenoid 105 of the electromagnetic valve 38 for fuel spilling in the reverse direction to that which was performed before, the collector and the emitter of the transistor 409, and the diode 411, and then to ground. Therefore, a reverse solenoid current as shown in FIG. 9d is supplied through the solenoid 105 in the direction indicated by a dashed arrow in FIG. 8. Because this negative electric current is contrary to that which was present a moment before in the solenoid coil 105, it positively and forcibly moves the valve element 133, etc., to the right as seen in FIG. 3, thus aiding the action of the pressure in the high pressure chamber 40 in opening the passage through the valve seat member 138 (in the first preferred embodiment, described above, this pressure alone was relied upon for such opening of the valve), and thus more quickly and positively opening the valve 38 as a whole. Thus the fuel spilling is performed even more positively and immediately than in the case of the first preferred embodiment described above.

Next, in the step 614, the program continues when the time count becomes equal to the set time T3 for ending of the reverse control current in the comparison register #1, and then in the step 615 the outputting of ther reverse control current by the microcomputer to the retaining current terminal Tr is terminated. At this time, all of the transistors 409, 417, and 419 are turned OFF, thereby cutting off the electric current which was flowing through the solenoid coil 105 of the electromagnetic valve 38 for fuel spilling. Finally, the program of FIG. 11 comes to an end with a return instruction.

In the above description of the second preferred embodiment, it was practiced that the reverse control current was maintained at a fixed value for a predetermined time interval (T3-T2), and thus the electromagnetic valve solenoid voltage was maintained at a fixed value by a negative electric current, but in fact the voltage waveform of the electromagnetic solenoid current might be a waveform of some different pattern. For example, as suggested in FIGS. 10 and 10b, it might be practiced for the negative electric current to be supplied to the solenoid 105 of the electromagnetic valve 38 for fuel spilling immediately after the end of fuel injection (T2), and for then the current to be returned to zero by means of a stepped waveform (see FIG. 11a); or alternatively the current could be brought back to zero by a reversed and stepped waveform (see FIG. 11b), which would have advantages for demagnetizing the iron core 107 by the use of hysteresis. However, actual control circuits for performing these functions are not particularly shown herein, because based upon the disclosure herein and upon this description of their functions various possible constructions for such circuits will be conceived of by one of ordinary skill in the relevant art without undue difficulty.

Thus, it will be understood that according to the shown second preferred embodiment of the present invention the effects of residual magnetism in the magnetizable parts of the electromagnetic valve 38 for fuel spilling, such as the iron core 107 and the like, are prevented from causing any problems, by the supply of reverse electrical energy to the solenoid coil 105. This is very important, with regard to improving the response time and the performance as a whole of the valve, and especially so when the valve is used for such an application as that disclosed with respect to the first preferred embodiment, in which fuel injection is performed in separate pilot and main fuel injection spirts.

Although the present invention has been shown and described with reference to the preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, the particular valve operating method explained with regard to the second embodiment of the present invention, in which the current through the electromagnetic solenoid coil was reversed in order to reverse the operation of the valve, could be combined with the particular operational application disclosed with regard to the first preferred embodiment—that of performing fuel injection in two separate fuel injection spirts, a pilot fuel injection spirt and a main fuel injection spirt. Various other modifications are also possible. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A fuel injection system for a diesel engine having a plurality of cylinders coupled to a crankshaft, the fuel injection system comprising:

a housing with a cylindrical bore formed therein;

an input shaft mounted coaxially with said bore and rotatable in a predetermined phase relation with the crankshaft of the engine;

a plunger slidably mounted in said bore, one end of the plunger defining with the bore a high pressure chamber, and another end of the plunger being rotationally engaged with said input shaft but being free to move axially with respect to the input shaft;

means for axially reciprocating said plunger in the bore according to the rotational position of the plunger;

means for communicating said high pressure chamber selectively with respective cylinders of the engine according to the rotational position of said plunger substantially only when the plunger is moving in a delivery stroke, axially in a direction to reduce the size of said high pressure chamber;

a valve body having an internal chamber communicating with said high pressure chamber, with a vent passage leading from the internal chamber for venting said high pressure chamber;

a valve element located in said internal chamber and having an orifice, one side of the orifice communicating with said high pressure chamber, said valve element controlling said vent passage so as to close said vent passage when said valve element is shifted to an end position of the valve element with no pressure difference existing through said orifice opening and to open said vent passage when said valve element is shifted away from said end position to be more remote from said high pressure chamber due to a pressure difference caused through said orifice opening;

an electromagnetically operated pilot valve which is selectively electromagnetically driven when electrical energy is supplied thereto so as to close a normally open passage which vents a space on the other side of said orifice remote from said high pressure chamber; and control means for selectively actuating and deactuating said electromagnetic valve so as to provide injected fuel in appropriate amounts to the engine, wherein said control means comprises:

means for calculating a first amount of fuel for a pilot fuel injection spirt and a second amount of fuel for a main fuel injection spirt for each combustion stroke of each cylinder of the engine based upon data with regard to operation of the engine, the results of calculation of said first and second amounts being reduced, during each delivery stroke of said plunger, to first and second time points when said pilot fuel injection spirt is started and ended, respectively, and third and fourth time points when said main fuel injection spirt is started and ended, respectively; and means for supplying electric current to said electromagnetically operated pilot valve in the period between said first and second time points and in the period between said third and fourth time points.

2. A fuel injection system according to claim 1, wherein said control means further comprises means for detecting the start of combustion in the cylinder and said third time point is determined by said calculating means to occur a predetermined time duration later than the start of ignition of the fuel of said pilot fuel injection spirt in the cylinder of the engine.

3. A fuel injection system according to claim 1, wherein said electromagnetically operated pilot valve comprises:

a solenoid, a core which is electromagnetically driven by said solenoid, and a valve element supported by said core, said core being driven by said solenoid in a first direction to drive said valve element to a position for closing said pilot valve when said solenoid is supplied with electric current in a first direction therethrough, said core being driven by said solenoid in a second direction opposite to said first direction to drive said valve element to a position for opening said pilot valve when said solenoid is supplied with electric current in a second direction opposite to said first direction therethrough, said means for calculating the first amount of fuel to be injected in each combustion stroke of each cylinder being further programmed such that the results of calculation of said first amount are reduced to said first time point when an initiation current and a retaining current are started, a time point between said first and second time points when said initiation current is ended, said second time point when said retaining current is ended and a reverse control current is started, and a time point not later than said third time point when said reverse control current is ended, and said means for supplying electric current comprises means for supplying said initiation and said retaining currents through said solenoid in said first direction and said reverse control current through said solenoid in said second direction.

* * * * *

UNITED STATES PATENT AND TRADEMARK OFFICE
CERTIFICATE OF CORRECTION

PATENT NO. : 4,579,096

DATED : April 1, 1986

INVENTOR(S) : F. Kobayashi et al.

It is certified that error appears in the above-identified patent and that said Letters Patent is hereby corrected as shown below:

Column 7, line 5, change "in" to --an--.

Column 10, line 11, change "if" to --is--.

Column 11, line 44, change "piston" to --pistons--.

Column 13, line 48, change "appropriate of" to --appropriate one of--.

Column 13, line 59, change "40, the injection" to --40, and the injection--.

Column 14, line 38, change "spirt of and" to --spirt of fuel and--.

Column 15, line 36, change "is ceased" to --ceases--.

Column 16, line 1, change "is ceased" to --ceases--.

Column 16, line 12, change "provided" to --injected--.

Column 20, line 4, change "ther" to --the--.

UNITED STATES PATENT AND TRADEMARK OFFICE
CERTIFICATE OF CORRECTION

PATENT NO. : 4,579,096

DATED : April 1, 1986

INVENTOR(S) : F. Kobayashi et al.

Page 2 of 2

It is certified that error appears in the above-identified patent and that said Letters Patent is hereby corrected as shown below:

Column 20, line 50, change "embodiment" to --embodiments--.

Column 22, line 51, change "initiation and" to --initiation currents and--.

Signed and Sealed this

Sixteenth Day of September 1986

[SEAL]

Attest:

DONALD J. QUIGG

Attesting Officer

Commissioner of Patents and Trademarks